United States Patent [19]

Ueda et al.

[11] Patent Number: 5,025,083

[45] Date of Patent: Jun. 18, 1991

[54] PROCESS FOR PREPARATION OF POLYCARBONATE

[75] Inventors: Mitsuru Ueda, Yamagata; Tatsuya Kanno, Hyogo; Yoshihiro Iguchi, Hyogo; Yasuhiro Oshino, Hyogo, all of Japan

[73] Assignee: Daicel Chemical Industries, Ltd., Sakai, Japan

[21] Appl. No.: 475,206

[22] Filed: Feb. 2, 1990

Related U.S. Application Data

[63] Continuation-in-part of Ser. No. 423,336, Oct. 18, 1989, abandoned.

[30] Foreign Application Priority Data

Feb. 10, 1989 [JP] Japan .................................. 1-31904
Jun. 23, 1989 [JP] Japan ................................. 1-161039
Oct. 26, 1989 [JP] Japan ................................. 1-279048

[51] Int. Cl.$^5$ ...................... C08G 64/28; C08G 64/30

[52] U.S. Cl. .................................... 528/199; 528/196; 528/198; 528/204

[58] Field of Search ................ 528/199, 198, 196, 204

[56] References Cited

U.S. PATENT DOCUMENTS 4,286,085 8/1981 Jaquiss et al. ........................ 528/199

Primary Examiner—Harold D. Anderson
Attorney, Agent, or Firm—Flynn, Thiel, Boutell & Tanis

[57] ABSTRACT

A polycarbonate is produced by melt-polycondensing (A) a dihydric phenol with a co-monomer selected from the group consisting of (B) bisphenol carbonate, (C) bis(2,4,6-trichlorophenyl) carbonate (D) bis(2,4,-dichlorophenyl) carbonate and (E) bis(2-cyanophenyl) carbonate in the presence of a catalyst selected from among electron-donating amine compounds and salts thereof. The process of the invention saves the use of phosgene which is poisonous and prevents the resulting polycarbonate from incorporation thereinto of chlorine ions.

5 Claims, No Drawings

PROCESS FOR PREPARATION OF POLYCARBONATE

This application is a continuation-in-part of U.S. patent application Ser. No. 07/423 336, filed Oct. 18, 1989.

The present invention relates to a process for preparing a high-molecular polycarbonate prepared by melt-polycondensing a dihydric phenol or a hydroxy compound with bisphenyl carbonate or another substituent-having bisphenyl carbonate in the presence of an electron-donating amine compound catalyst or salts thereof.

PRIOR ART

The high-molecular polycarbonate of the present invention is a general purpose engineering thermoplastic which can be used in wide applications, particularly in injection molding or as a glass sheet instead of a window glass. Interfacial polycondensation is generally effective in producing polycarbonate but has drawbacks that toxic phosgene should be used and chloride ions remain in the formed polycarbonate. In order to eliminate these drawbacks, Japanese Patent Laid-Open No. 182336/1988 discloses production of a polycarbonate through interfacial polycondensation of a particular dihydric alcohol with liquid trichloromethyl chloroformate used instead of toxic phosgene. However, only 9,9-bis(4-hydroxyphenyl)fluorene is described as the particular dihydric phenol. Angew. Chem., 99, 922 (1987) describes that a polycarbonate is prepared from 2,2-bis(4-hydroxyphenyl)propane by making use of triphosgene instead of toxic phosgene. However, it also describes a reaction mechanism by which phosgene is generated.

SUMMARY OF THE INVENTION

In the invention a polycarbonate is produced by melt-polycondensing (A) a dihydric phenol, or a hydroxy compound, with a co-monomer selected from the group consisting of (B) bisphenol carbonate, (C) bis(2,4,6-trichlorophenyl) carbonate, (D) bis(2,4-dichlorophenyl) carbonate and (E) bis(2-cyanophenyl) carbonate in the presence of a catalyst selected from among electron-donating amine compounds and salts thereof. The process of the invention saves the use of phosgene which is poisonous and prevents the resulting polycarbonate from incorporation thereinto of chlorine ions.

The dihydric phenol (A) is preferred to be one of those having the following formulae (I), (II), (III) and (IV):

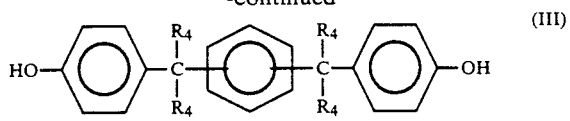
(I)

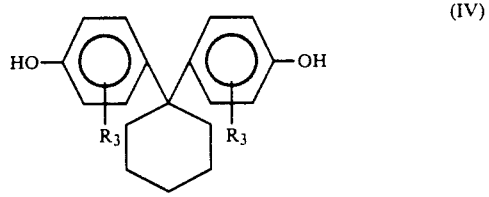
(II)

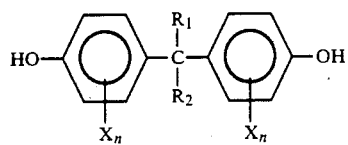
(III)

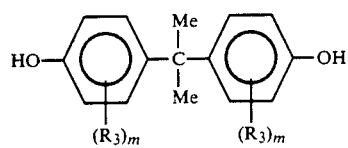
(IV)

wherein $R_1$, $R_2$, $R_3$ and $R_4$ are each hydrogen, a straight-chain or branched alkyl group having 1 to 8 carbon atoms, or a phenyl group, X is a halogen atom, n is 0 to 4, and m is 1 to 4.

Representative examples of the electron donating amine compound which may be used in the present invention include N,N-dimethyl-4-aminopyridine, 4-diethylaminopyridine, 4-pyrrolidinopyridine, 4-(5-quinolyl)-pyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, 2-aminopyridine, aminoquinoline, imidazole, 2-methylimidazole, 4-methylimidazole, diazabicyclooctane (DABCO), etc.

In the present invention, the electron donating amine compound can be used in the form of a salt in which the counter ion is an acid including, for example, carbonic acid, acetic acid, formic acid, nitric acid, nitrous acid, oxalic acid, sulfuric acid, phosphoric acid, fluoroboric acid and hydroboric acid. Chlorides of the electron donating amine compounds are excluded from the scope of the present invention.

Representative examples of the dihydric phenol include the following compounds. Examples of the bisphenol represented by the general formula (I) include 2,2-bis-(4hydroxyphenyl)propane, 2,2-bis-(4-hydroxyphenyl)butane, 2,2-bis-(4-hydroxyphenyl)-4-methylpentane, 2,2-bis-(4hydroxyphenyl)octane, 4,4'-dihydroxy-2,2,2-triphenylethane, and 2,2-bis-(3,5-dibromo-4-hydroxyphenyl)propane. Examples of the bisphenol represented by the general formula (II) include 2,2-bis-(4-hydroxy-3-methylphenyl)propane, 2,2-bis-(4-hydroxy-3-isopropylphenyl)propane, 2,2-bis-(4-hydroxy-3-secbutylphenyl)propane, 2,2-bis-(3,5-dimethyl-4hydroxyphenyl)propane, and 2,2-bis-(4-hydroxy-3-tertbutylphenyl)propane. Examples of the bisphenol represented by the general formula (III) include 1,1'-bis-(4-hydroxyphenyl)-p-diisopropylbenzene, and 1,1'-bis-(4-hydroxy-opropylbenzene. Examples of the bisphenol represented by the general formula (IV) include 1,1-bis(4-hydroxyphenyl)cyclohexane. Further, it is also possible to prepare a copolycarbonate through a combination of at least two dihydric phenols selected from among those represented by the general formulae (I), (II), (III) and (IV).

The method according to the present invention can be practiced by melt-polycondensing a dihydric phenol, such as bisphenol A, with bisphenyl carbonate in the presence of a catalyst selected from among electron-donating amine compounds.

This reaction is conducted at a temperature in the range of 100° to about 300° C., preferably 130° to 280°

C. When the temperature is below 130° C., the reaction rate is reduced, while when the temperature exceeds 280° C., a side reaction tends to occur.

The electron-donating amine compound used as a catalyst should be used in an amount of $10^{-1}$ to $10^{-5}$ mol, preferably $10^{-2}$ to $10^{-4}$ mol, based on the dihydric phenol present in the reaction system. When the amount is less than $10^{-5}$ mol, the rate of polymerization of polycarbonate is reduced because of poor catalytic action. On the other hand, when the amount is more than $10^{-1}$ mol, the proportion of the catalyst remaining in the resultant polycarbonate is increased, which brings about a lowering in the properties of the polycarbonate.

Bisphenyl carbonate should be used in an equimolar amount to the dihydric phenol. In general, in order to form a high-molecular polycarbonate, 1 mol of a carbonate compound should be reacted with 1 mol of a dihydric alcohol. When bisphenol carbonate is used, 2 mol of phenol is formed by the above-described reaction. The 2 mol of phenol thus formed is distilled away outside the reaction system.

When the co-monomer is one of (C), (D) and (E), it is preferable that m is 1 in the formula (II) for the first monomer (A), the reaction is conducted at a temperature ranging from 130° to 250° C., an amount of the catalyst ranges from $10^{-1}$ to $10^{-3}$ mole.

The present invention will now be described by way of examples which should not be construed as limiting the scope of the present invention.

EXAMPLES

Example 1

22.8 g (0.1 mol) of 2,2-bis(4-hydroxyphenyl)propane was mixed with 0.164 g ($2\times10^{-2}$ mol) of 2-methylimidazole and 21.4 g (0.1 mol) of bisphenyl carbonate, and the mixture was stirred at 180.C for 1 hour in a nitrogen atmosphere. The temperature of the system was raised while gradually evacuating the system. Finally, polycondensation was conducted at 270.C and 0.1 Torr for 1 hour and the formed phenol was distilled away to prepare a clear polycarbonate. The viscosity-average molecular weight ($\overline{M}v$) was determined to be 29,000. The glass transition temperature was 150° C.

The viscosity-average molecular weight was determined by measuring the intrinsic viscosity [$\eta$] of the polymer in the form of a methylene chloride solution at 20° C. with an Ubbelohde's viscometer and calculating the viscosity-average molecular weight ($\overline{M}v$) according to the following equation:

$$[\eta] = 1.11 \times 10^{-4} (\overline{M}v)^{0.82}$$

Example 2

0.0122 g ($1\times10^{-4}$ mol) of 4-dimethylaminopyridine was added, instead of 2-methylimidazole to 22.8 g (0.01 mol) of 2,2-bis(4-hydroxyphenyl)propane and 21.4 g (0.1 mol) of bisphenyl carbonate under the same condition as that of Example 1. The mixture was stirred for 2 hours in a nitrogen atmosphere, and polycondensation was conducted in the same manner as that of Example 1 to prepare a clear polycarbonate. The viscosity-average molecular weight ($\overline{M}v$) was determined to be 28,000. The glass transition temperature was 150° C.

Example 3

11.4 g (50% by mole) of 2,2-bis(4-hydroxyphenyl)propane, 17.0 g (50% by mole) of 2,2-bis(4-hydroxy-3-tertbutylphenyl)propane, and 0.068 g ($10^{-3}$ mol) of imidazole were stirred for 2 hours in a nitrogen atmosphere, and polycondensation was conducted in the same manner as that of Example 1 to prepare a clear polycarbonate. The viscosity-average molecular weight ($\overline{M}v$) was determined to be 25,000 and the glass transition temperature was 128° C.

Comparative Example 1

The same treatment as that of Example 1 was conducted except that pyridine, instead of 2-methylimidazole, was added to 22.8 g (0.1 mol) of 2,2-bis(4-hydroxyphenyl)propane and 21.4 g (0.1 mol) of bisphenyl carbonate under the same condition as that of Example 1. However, the viscosity-average molecular weight ($\overline{M}v$) of the resultant polycarbonate was as low as 4,000, which was unsuitable for practical use although it was in the form of polycarbonate.

Example 4

42.09 g (0.1 mol) of bis(2,4,6-trichlorophenyl) carbonate was added to 22.8 g (0.1 mol) of 2,2-bis(4-hydroxyphenyl)propane and 0.122 g [$10^{<2}$ mole based on 2,2-bis(4-hydroxyphenyl)propane] of 4-dimethylaminopyridine, and the mixture was stirred at 160° C. for 1 hour in a nitrogen atmosphere. The temperature of the system was raised while gradually evacuating the system. Finally, polycondensation was conducted at 230° C. and 0.1 Torr for 1 hour and the formed 2,4,6-trichlorophenol was distilled away to prepare a clear polycarbonate. The viscosity-average molecular weight ($\overline{M}v$) was determined to be 29,000. The glass transition temperature was 150° C.

The viscosity-average molecular weight was determined by measuring the intrinsic viscosity [$\eta$] of the polymer in the form of a methylene chloride solution at 20° C. with an Ubbelohde's viscometer and calculating the viscosity-average molecular weight ($\overline{M}v$) according to the following equation:

$$[\eta] = 1.11 \times 10^{-4} (\overline{M}v)^{0.82}$$

Example 5

0.068 g [$10^{-2}$ mole based on 2,2-bis(4-hydroxyphenyl)propane] of imidazole was added, instead of 4-dimethylaminopyridine, to 42.09 g (0.1 mol) of bis(2,4,6-trichlorophenyl)carbonate and 22.8 g (0.1 mol) of 2,2-bis(4-hydroxyphenyl)propane the same condition as that of Example 4. The mixture was stirred for 2 hours in a nitrogen atmosphere, and polycondensation was conducted in the same manner as that of Example 1 to prepare a clear polycarbonate. The viscosity-average molecular weight ($\overline{M}v$) was determined to be 28,000. The glass transition temperature was 150° C.

Example 6

11.4 g (50% by mole) of 2,2-bis(4-hydroxyphenyl)propane, 17.0 g (50% by mole) of 2,2-bis(4-hydroxy-3-tertbutylphenyl)propane, and 0.068 g [$10^{-2}$ mole based on the bisphenol component] of imidazole were stirred for 2 hours in a nitrogen atmosphere, and polycondensation was conducted in the same manner as that of Example 4 to prepare a clear polycarbonate. The viscosity-average molecular weight ($\overline{Mv}$) was determined to be 25,000 and the glass transition temperature was 128° C.

Example 7

In a reaction vessel were placed 22.8 g (0.1 mol) of 2,2-bis(4-hydroxyphenyl)propane, 0.288 g ($2 \times 10^{-3}$ mol) of 2-methylimidazole carbonate, and 21.4 g (0.1 mol) of bisphenyl carbonate. The reactants were stirred at 180° C. for 1 hour under a nitrogen atmosphere. The reaction system was heated to 270° C. with gradual evacuation to 0.1 Torr. Polycondensation was carried out at this temperature and pressure for 1 hour, with continuous removal by distillation of phenol resulting from the reaction. Thus there was obtained a colorless transparent polycarbonate which has a viscosity-average molecular weight ($\overline{Mv}$) of 27,000 and a glass transition point of 150° C.

The viscosity-average molecular weight was calculated from the following formula:

$$[\eta] = 1.11 \times 10^{-4} (\overline{Mv})^{0.82}$$

where [$\eta$] is an intrinsio viscosity of the polymer solution in methylene chloride measured with an Ubbelohde viscometer at 20° C.

Example 8

The same procedure as in Example 7 was repeated except that the 2-methylimidazole carbonate was replaced by 0.0184 g ($1 \times 10^{-4}$ mol) of 4-dimethylaminopyridine carbonate and the reactants were stirred for 2 hours. There was obtained a colorless transparent polycarbonate, which has a viscosity-average molecular weight ($\overline{Mv}$) of 28,000 and a glass transition point of 150° C.

Example 9

The same procedure as in Example 7 was repeated except that the reactants were replaced by 11.4 g (50 mol%) of 2,2-bis(4-hydroxyphenyl)propane, 17.0 g (50 mol%) of 2,2-bis(4-hydroxy-3-tert-butylphenyl)propane, and 0.113 g ($10^{-3}$ mol%) of imidazole oxalate and the reactants were stirred for 2 hours. There was obtained a colorless transparent polycarbonate, which has a viscosity-average molecular weight ($\overline{Mv}$) of 25,000 and a glass transition point of 128° C.

Example 10

In a reaction vessel were placed 22.8 g (0.1 mol) of 2,2-bis(4-hydroxyphenyl)propane, 42.1 g (0.1 mol) of bis(2,4,6-trichlorophenyl)carbonate, and 0.0182 g ($10^{-4}$ mol) of dimethylaminopyridine acetate. The reactants were stirred at 180° C. for 1 hour under a nitrogen atmosphere. The reaction system was heated to 280° C. with gradual evacuation to 0.1 Torr. Polycondensation was carried out at this temperature and pressure for 1 hour, with continuous removal by distillation of 2,4,6-trichlorophenol resulting from the reaction. Thus there was obtained a colorless transparent polycarbonate, which has a viscosity-average molecular weight ($\overline{Mv}$) of 27,500 and a glass transition point of 151° C.

Comparative Example 2

The same procedure as in Example 7 was repeated except dine carbonate. There was obtained a colorless transparent polycarbonate, which has a viscosity-average molecular weight ($\overline{Mv}$) of 4,000. This polycarbonate was unsuitable for practical use because of its extremely low molecular weight.

EFFECT OF THE INVENTION

The process of the present invention, which employs an electron donating amine compound as a catalyst, or a salt thereof, makes it possible to produce, without resorting to toxic phosgene, a high-molecular weight, colorless transparent polycarbonate which is substantially free of chlorine ions.

What is claimed is:

1. A process for preparing a polycarbonate comprising melt-polycondensing (A) at least one dihydric phenol with a co-monomer selected from the group consisting of (B) bisphenyl carbonate, (C) bis(2,4,6-trichlorophenyl) carbonate, (D) bis(2,4-dichlorophenyl) carbonate and (E) bis(2-cyanophenyl) carbonate in the presence of a catalyst selected from among electron-donating amine compounds or salts thereof, with the proviso that said salt is other than a chloride.

2. The process as claimed in claim 1, in which (A) is at least one member selected from the group consisting of (I), (II), (III) and (IV):

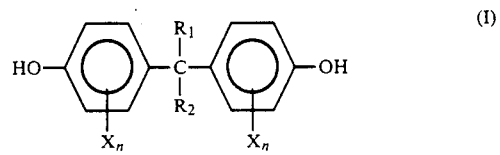

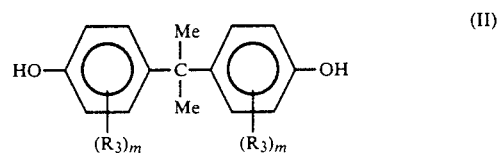

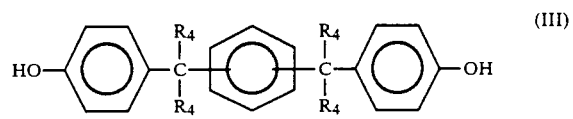

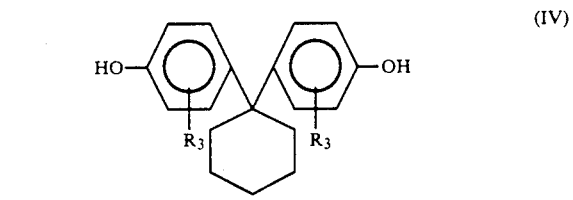

in which $R_1$, $R_2$, $R_3$ and $R_4$ are hydrogen or an alkyl having 1 to 8 carbon atoms and being either straight or branched or phenyl, X is a halogen, n is a number of zero to 4 and m is a number of 1 to 4.

3. The process as claimed in claim 1, in which the catalyst is present in an amount of $10^{-1}$ to $10^{-5}$ mole per 1 mole of the dihydric phenol.

4. The process as claimed in claim 1, in which the catalyst is present in an amount of $10^{-1}$ to $10^{-3}$ mole per 1 mole of the dihydric phenol.

5. The process as claimed in claim 2, in which the monomer (A) comprises two or more members selected from the group consisting of (I) to (IV).

* * * * *